Dec. 23, 1941.  C. P. XENIS  2,267,006
MULTIPLE CABLE CONNECTION
Filed April 8, 1941  2 Sheets-Sheet 1
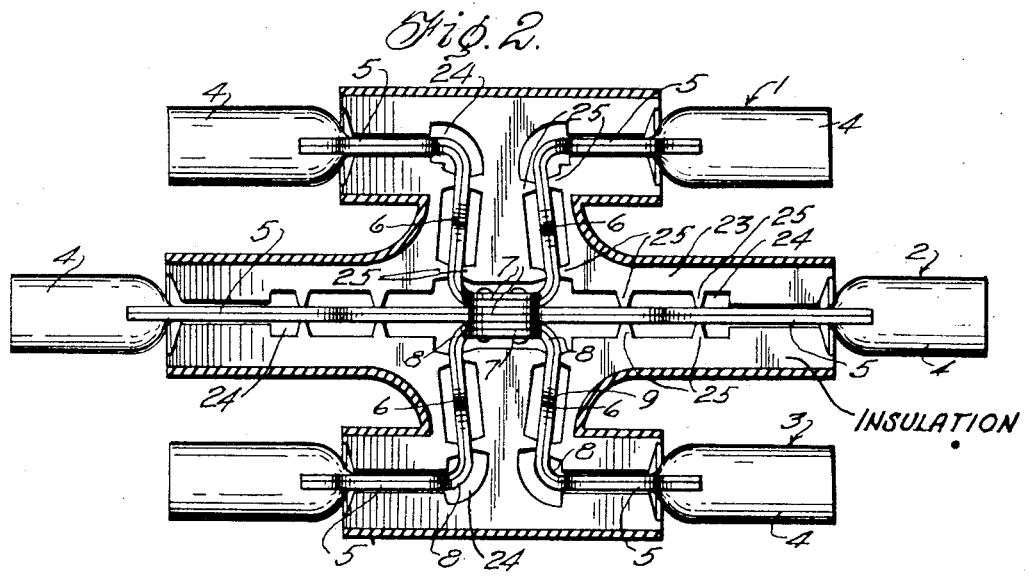
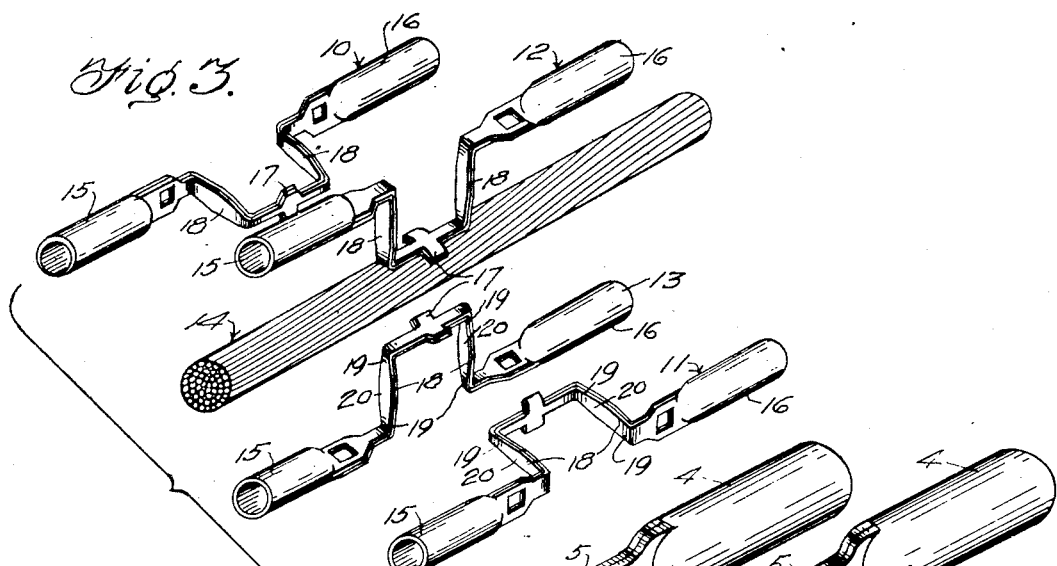
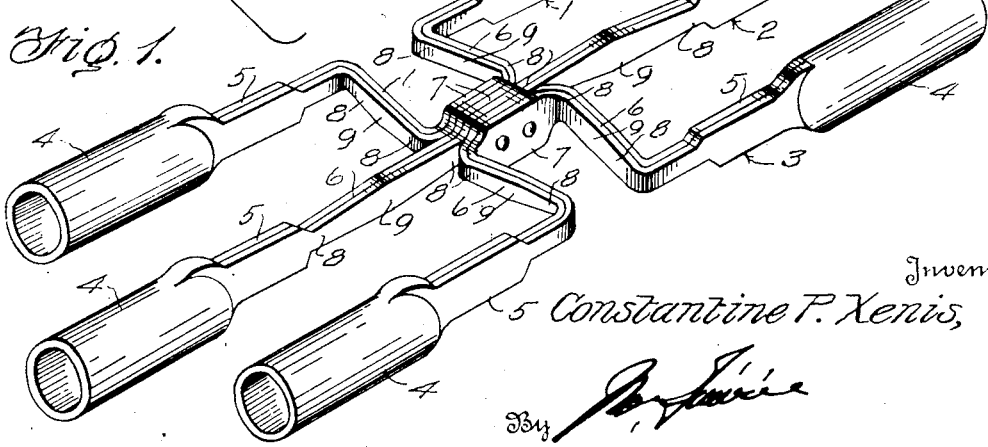
Inventor
Constantine P. Xenis,
By
Attorney Dec. 23, 1941.    C. P. XENIS    2,267,006
MULTIPLE CABLE CONNECTION
Filed April 8, 1941    2 Sheets—Sheet 2
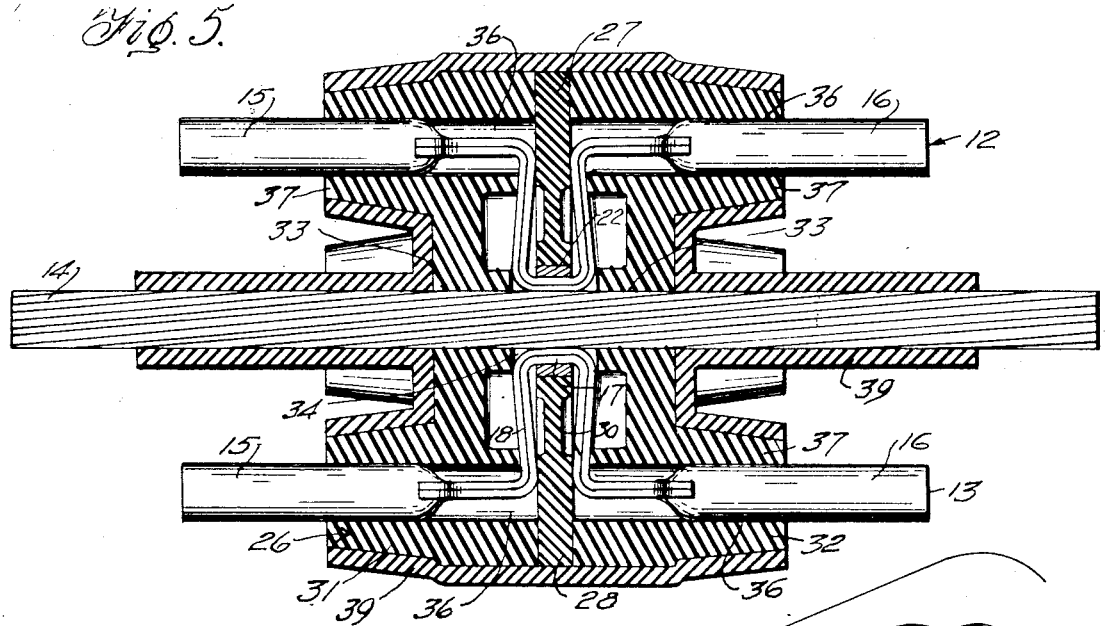
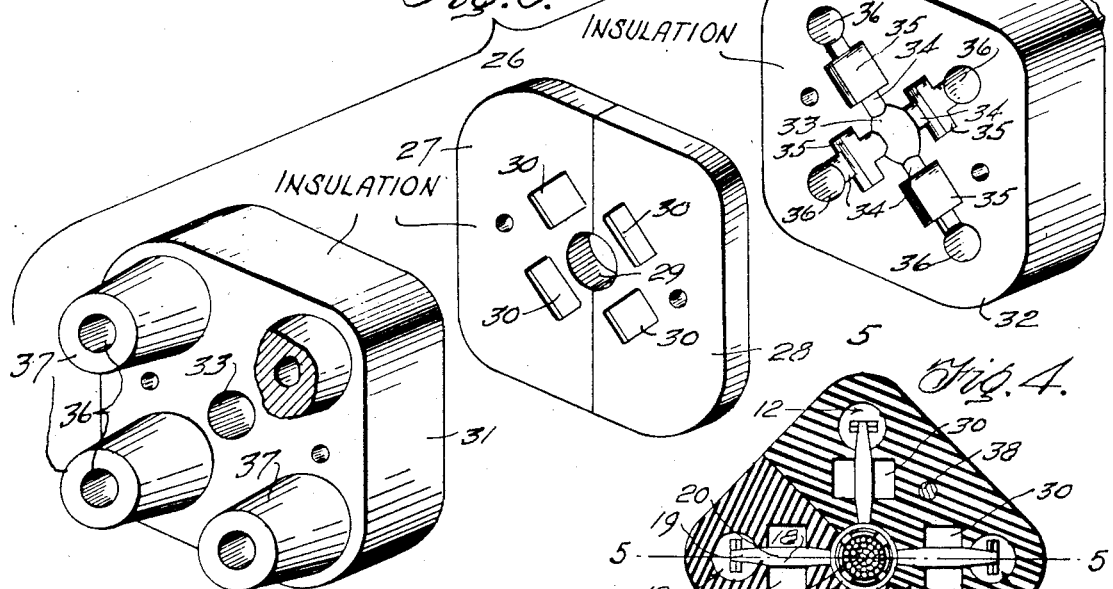
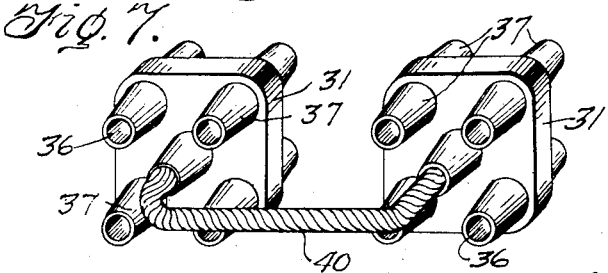
Inventor
Constantine P. Xenis,
By
Attorney Patented Dec. 23, 1941

2,267,006

UNITED STATES PATENT OFFICE 2,267,006

MULTIPLE CABLE CONNECTION

Constantine P. Xenis, Little Neck, N. Y., assignor to Consolidated Edison Company of New York, Inc., New York, N. Y., a corporation of New York Application April 8, 1941, Serial No. 387,544

16 Claims. (Cl. 200—133)

This invention is directed to a multiple cable connection designed more particularly for use in underground cable systems, and particularly directed to what is commercially known as a crab joint, wherein the mains cables are, through the use of such joint, electrically interconnected and may be joined to auxiliary or service cables, and wherein each connection of a cable terminal through the joint is separately and independently protected by a limiter section of the type described and claimed in my copending application, filed June 6, 1939, Serial No. 277,741.

The primary object of the present invention is the provision of a crab joint or connector in the use of which a plurality of cable lengths including the mains cable lengths are readily and conveniently electrically connected through the use of a single unitary element, with at least some of the cable lengths protected within the unitary element by a limiter or fuse section so that in the event that a fault develops in one of the particular cables the limiter element will fuse and open the cable circuit thus interrupting the flow of current to the point of fault before this short circuit current has time to cause destruction to the cable insulation through excessive heat at points beyond where the fault was initiated.

In its essential characteristics, the improved crab joint is made up as a unit formed to receive the terminals of all cable lengths to be connected by the unit, with such unit including a centrally arranged or intermediate metallic body which forms an electrical connection between each and every one of the associated cable lengths, together with the provision of a particular type of limiter section or fuse between such central or intermediate body and some or all cable connectors, whereby each such cable length is protected against the flow of a destructive fault current into that length without interrupting the electrical continuity and complete service facility of every other cable length carried by the crab joint.

The invention further includes the provision of a shell for the elements of the crab joint to confine the arc incident to the blowing of any fuse to a restricted space, while at the same time confining the molten metal following the blowing of the fuse in a manner to prevent it from bridging the unblown portions of the fuse, with the further provision of a unitary particularly formed waterproof insulating sheath completely covering the shell.

The invention also includes a slightly modified form of crab joint, wherein provision is made for cable connection to the unit without the provision of a fusing section protection for such particular cable connection. This permits a modified form of crab-joint, which is otherwise provided with additional cable connections, each protected by fusing sections, to be electrically connected to one or more additional modified crab joints, in order to provide for cable connections in a particular installation where the cables to be connected exceed in number the number of cable connectors in any one crab joint. In this way the crab joint may be constructed in a comparatively few standard forms, with different numbers of cable connectors, and such units electrically connected in installations where the cables exceed the number of cable connectors in any one unit.

The invention is illustrated in the accompanying drawings, in which

Figure 1 is a perspective view of one form of the improved crab joint as a unit.

Figure 2 is a sectional view, partly in elevation of the form of crab joint shown in Figure 1 as a complete assembly.

Figure 3 is a perspective view of a second form of crab joint with the parts separated.

Figure 4 is a transverse section of the complete assembly of the form of crab joint shown in Figure 3.

Figure 5 is an enlarged section on the line 5—5 of Figure 4.

Figure 6 is a perspective view of the several parts of the casing for the second form of crab joint, the parts of the casing being shown separated.

Figure 7 is a diagrammatic view showing two crab joints of the second form in electrical connection for multiple use.

In the specific form of the crab joint illustrated more particularly in Figures 1 and 2, it will be noted that the crab joint is shown as a unitary construction of rigid association and presenting means for connecting six cable terminals in electrically continuity. It will be quite apparent from the following description that the crab joint is not in any way limited for connecting six cable lengths, and that the formed elements to be later described may be assembled in greater or less number than that shown; or that the crab joint, say of a more or less standard type and of the form illustrated in Figure 1, may without change be used for connecting a lesser number of cable sections than that for which the particular crab joint is specifically constructed in order to meet the requirements of a particular use or situation.

As illustrated in Figure 1, the crab joint is made up of a plurality of independent more or less similar sections which are then connected rigidly and firmly to provide the ultimate unit. In the form shown, there are three such sections, 1, 2 and 3, each of substantially identical form. Each such section is, as specifically described and claimed in the co-pending application previously referred to, preferably, though not necessarily, constructed of a single tube, preferably, though again not necessarily, of copper. The tube, throughout a material length terminating at each end short of the ends of the tube, is subjected to a forming pressure to flatten the area into a length of double thickness as compared with the thickness of the wall of the original tube. The forming pressure is, as stated, applied to an intermediate length of the tube short of the ends thereof, and that portion at each end of the tube which is unaffected by, or not subjected to the pressure, remains in its original tubular form and is of sufficient length to provide terminal connectors 4 for receiving and rigidly supporting the ends of the sections to be connected.

The forming pressure to which the intermediate portion of the tube is subjected results in a particular final form of the tube section intermediate the cable terminal connectors. This particular form may obviously be provided through suitable combination of the pressing and cutting dies so that the deformation and shaping of the central portion of the tube with its resultant desired specific form may be carried out in one stamping operation, though obviously, and as is contemplated within the spirit of the present invention, the tube throughout the desired length may be first subjected to the deforming pressure, and then later, and as a subsequent operation, shaped to the desired outline by appropriate dies or other cutting.

The formed section of the tube is, when finally shaped, provided adjacent each cable connector 4 with a flat section 5 of appropriate length, which merges into the cable connector at one end and beyond such end is shaped into a limiter or fuse section 6, which will be hereinafter more particularly described. At the central portion of the formed length of the tube, that is, between the respective fuse sections 6, there is provided a flat plate-like section 7 hereinafter termed the junction plate, which, in common with the other portions of the formed area, is made up of two layers of material naturally resulting from the compression of the tube form.

Thus each section of the crab joint presents an integral formation having a cable connector at each end, an intermediate junction plate, and a limiter or fuse section between the intermediate junction plate and each cable connector.

The limiter section 6 on each side of the junction plate 7 is of particular and peculiar formation designed to provide a proper protection against the flow of destructively heavy currents for that cable beyond the particular limiter relative to the central plate section 7. This limiter which is more particularly described and claimed in the co-pending application is in itself of definite length and has end sections 8 of relatively narrow width and an intermediate section 9 of relatively wider width, the metal of the limiter gradually increasing in width from the narrow portions 8 to the intermediate or wider portion 9.

Briefly, the limiter is designed as a time-delay fuse having particular relation to the cable damage characteristic of the cable being protected. By suitable laboratory and other actual service tests, knowledge is gained as to the length of time that the cable will support fault current before the insulation is destroyed or seriously damaged, and the limiter is formed as a result of this knowledge to fuse at the wider portion 9 of such limiter at a time short of but closely approaching that which would otherwise result in the destruction of the cable. That is, the particular formation of the limiter is such that the fault current which passes through the limiter element generates heat at such a rate that the limiter element fuses and opens the circuit just before the insulation of the faulted cable is destroyed by the heat of the fault current.

Owing to the diminished metal area of the narrow portions 8 of the limiter, there is a more rapid generation of heat than at the central wider portion 9. This central portion is enlarged to a degree, relative to the end portions, sufficiently to overcome partially the tendency of the temperature in the central portion of the fuse to rise faster than the temperature in the end portions. As a consequence, a greater amount of heat must be generated to heat the widened middle portion of the fuse and bring it to melting temperature and supply the heat of fusion than if the fuse were of uniform width throughout or a reduced width in the center. This necessarily results in considerably delaying the fusing action of the limiter section. In this connection, it will be understood that the initial tube from which the section being described is formed is of such wall thickness that the unformed portions or cable connectors 4 present a mass of sufficient strength to receive and support the cable end, while at the same time the formation of a thermal reservoir is avoided with a view to permitting the minimum heat transference from the limiter section.

With this limiter section form as described, it will be obvious that the relative proportions thereof can be readily constructed following a knowledge of the particular cable damage characteristic and that the limiter section so formed will fuse only following the development of a fault condition and the maintenance of that fault condition for a predetermined time slightly less than that necessary to cause the resultant short circuit current to destroy or seriously damage the cable insulation.

With this formation of limiter section, the cable is protected against currents of destructive magnitude, but will not and is not intended to fuse under fault conditions which either "burn clear" or are otherwise interrupted short of possible cable destruction. This permits the limiter section to maintain what may be termed an automatic check on cable faults and insure circuit rupture under conditions in which the cable is liable to destruction or serious damage and prevent such current interruption under lesser fault conditions. As the crab joint is designed for underground cable connections, this automatic control by the limiter section avoids the interruption of current continuity under those faults which "burn clear" or exist momentarily or for a period which does not tend to serious cable destructive influence and thus avoids the necessity of repair or replacement under minor fault conditions and yet effectively protects the cable against those faults which are maintained for a period which would, if not interrupted, result in cable destruction. Thus, for example, momentarily high overloads to which all such cable systems are subjected would not be maintained for a sufficient period of time to fuse the limiter and the cable will safely carry such overloads for the limited time which they endure.

The crab joint is thus made up of a plurality of independent members 1, 2 and 3, in the form shown, each of which is of integral construction, and each of which includes two end cable connectors, an intermediate junction plate, and a fuse section between such junction plate and each terminal connector.

For convenience in assembly in making up the unit crab joint, certain of the elements, as, for example, 1 and 3 in the particular form illustrated form, are centrally bent into U-form with the junction plate 7 at the center of the end bar of the U and the respective fusing sections forming the side bars of the U. The remaining portion of the formed limiter extends from the U-formation in substantial alignment. The section 2 is maintained in straight form and is the central member of the assembled crab joint. The junction plates 7 of the respective elements are disposed in alignment and in contact and then intimately secured together to maintain complete electrical continuity. The elements 1 and 3 are thus disposed outwardly of the central element 2, but all parts of all elements are in a single plane.

In the modified form of crab joint, as shown more particularly in Figures 3 to 7, provision is made for adapting the unit for association with and electrically connecting to similar joints in any particular installation requiring connection of a number of cables exceeding the capacity of any one crab joint.

The modification is of commercial and practical importance, as it permits the manufacture of a limited number of standard crab joints, say, for example, of four and six cable capacity, or, if desired, but one such standard type, and yet permit electrical connection of two or more such standard units where the cables to be connected exceed the capacity of any one crab joint. As it is plain from the preceding description that any one crab joint can accommodate installation of any number of cables equal to or less than its capacity, it follows that where additional cables are to be connected, one or several additional crab joints, if designed for electrical connection, one to another, may be associated in any one installation to accommodate all necessary cables.

As crab joints designed for electrical connection one with another must avoid the interruption of inter-electrical connection, the particular characteristic of the modified form is the elimination of any fusing section in the means for electrically connecting associated crab joints while providing such fusing protection to all other cable connections, and at the same time providing a unit construction.

The modified form of crab joints will be described as of the general type previously described, involving, however, eight connectors, as a convenient modified standard type, though obviously, any type of any desired number of connectors may be provided and all such are contemplated as within the scope of the invention.

In the modified form, five elements 10, 11, 12, 13 and 14 are provided, four of which, as 10, 11, 12 and 13, are substantially identical with the elements 1, 2, or 3 of the form first described. That is to say, the elements 10, 11, 12 and 13 each include an integral section having terminal cable connectors 15 and 16, a central junction plate 17, and a fusing section 18 between the junction plate and each cable connector. Of course, each fusing section 18 is of the particular form previously described, including the relatively narrow end portions 19 and the intermediate wider portion 20.

The third element 14, however, is, as shown, in the form of a cable element of electrically conductive material and of appropriate length. The elements are grouped about the element 14 for convenience, and the junction plates 17 of the elements 10, 11, 12 and 13 are formed about and placed in contact with the element 14 at 90° apart and secured to such element 14 in a permanent electrically conductive manner. An electrically conductive ring 22, as of copper, may then be arranged to encircle the junction plates of the elements 10, 11, 12 and 13 and secured to such junction plates.

This construction provides a completely unitary form, the parts of which are inseparable, and the connection of the various elements as described provides an electrical junction to establish common electrical continuity through each and every element.

In the use of the modified form, the cable connections 15 and 16 of the elements 10, 11, 12 and 13 provide for the connection of eight cables, electrically connected through the common junction, and each protected through its individual fusing section 18. It will, of course, be apparent that the blowing of any one or more of the fusing sections, while interrupting the energy to or from the affected cables, does not interrupt electrical continuity of the remaining cables, and also that as long as one fusing section 18 is intact, the energy flow through element 14 is maintained.

Now assume that a particular multiple-cable installation involves a greater number of cables than the capacity of one crab joint. In such case, two or more crab joints, whose combined cable capacity is at least equal to the number of cables to be installed, are electrically connected. This is provided for by connecting a short cable length 40 in appropriate juncture in and with one end of the element 14 of the crab joint. Thus two crab joints are available with their combined cable capacity. Of course, any number of crab joints may be connected, when required.

It is to be particularly noted that the electrical connection between crab joints must be free of any fusing section protection, for if such connection was interrupted, the electrical continuity of the cables of the de-energized crab joint or joints would be interrupted, notwithstanding the fact that such cables are free of any circuiting condition which would affect their individual fusing section.

Thus by constructing the crab joints of say one standard type, provision is made for taking care of any number of cables in a particular installation, by electrically connecting two or more crab joints. Of course, any one joint, whether used singly or with additional joints, is completely effective electrically for a number of cables less than its capacity, for all such cables of any one crab joint connection have a common electrical junction.

The element 14 of the crab joint is shown as a cable to which connecting cable or cables may be joined. If desired, the cable 14 may be substituted by a tube cable of corresponding length, the structure being otherwise the same. This change does not require specific illustration.

The crab joint of the form first described is preferably enclosed in a molded casing 23, made up in parts to be assembled in superimposed relation to cover completely all parts of the crab joint other than the cable terminal connectors. These parts of the casing are together formed with channels or recesses to receive the respective portions of the crab joint unit such channels or recesses being indicated at 24 and being formed in more or less shaped conformity with that of the parts inserted therein. The channels 24 which enclose the fusing sections 6 are formed beyond each terminal of the enlarged or fusing portion 9 of the fusing section with abutments 25, which of course confine the arc of fusion and prevent the molten material resulting from fusion from short circuiting the fuse portion.

The modified form of crab joint is also provided with a protective insulating and arc confining shell. The shell, indicated generally at 26, is made up of four parts for convenience of assemblage. Two such parts or sections 27 and 28 are identical, and each comprises a relatively narrow section of selected material of one-half the transverse dimension of the completed shell in one dimension, and of the full size of the shell in the opposite dimension. These sections are designed to be placed between the fusing sections of opposite elements, as 10 and 12 on one side and between the fusion sections of the remaining elements, as 11 and 13 on the opposite side. The sections are arranged with their inner edges in contact, so that when assembled these sections together constitute a single section, which, while sufficiently narrow to fit between the fusing section of the elements, are otherwise of the full dimensions of the shell.

The sections are each formed at their meeting edge with a recess 29, which recesses, when the sections are assembled, constitute an opening to more or less snugly embrace the ring about the electrical junction of the crab joint. Each section 27 and 28 is formed on each side beyond the recess with a depression 30, constituting part of the arc and molten material confining chamber for that part of the fusing sections of the elements which melts under the heat of fusion. The remaining two sections, indicated at 31 and 32, are arranged in contact with and at opposite sides of the sections 27 and 28, and are of the full width and height of the complete shell while of a length to complete with the sections 27 and 28 the full length of the shell. The sections 31 and 32 are each formed with a central opening 33 for reception of the electrical junction of the crab joint, and the element 14, and with four narrow channels 34 leading from the opening 33 to receive the fusing section of the elements 10, 11, 12 and 13. Each of these channels is enlarged at 35 opposite the depressions 30 of the shell sections 27 and 28, to form the complete arc and molten metal confining chamber in which is housed the fusible portion of the fusing sections. The channels 34 continue beyond the enlargement 35, and at the end of each channel each section 31 and 32 with an opening 36 for the passage of the cable connectors 15 and 16 of the crab joint. The outer surface of each section 31 and 32 has integral hollow nipples 37, the bores of which align with the openings 36. The shell parts are connected by through bolts 38.

The shells 10 and 26 are obviously designed to confine the arc and to protect the adjacent insulation, workmen and others who may be in the immediate vicinity at the time of fusion against danger of burns from molten copper and such casing while effective for this purpose is constructed of material which is arc-proof and which may be asbestos, cement or the like. This casing, though a good electrical insulator, is not water-proof, and therefore, it is contemplated and preferred that covering or shield 39 of rubber or like material be provided to fit closely and completely cover all exposed area of the casing 10. It is understood, of course, that when the crab joint is in place and the cables are connected, the cable terminal connectors 4 and 15 and 16 as well as cable 14 may be wrapped or otherwise taped for their complete insulated protection in a manner conveniently employed in making such connections.

In the use of the crab joint, it will be apparent that the junction plates 7 when connected as described, constitute an electrical junction at which all remaining portions of the joint are connected together as a unit. This junction permits free electrical interchange between any one cable and all the other cables so that the crab joint provides a tie or common junction for all mains cables and a source of supply to service cables which supply electrical energy to customers from the mains system.

It will be further noted that each cable section connected to the joint is protected in the manner previously described by an individual fusing section peculiar to that particular cable section. If one such fusing section should blow, the cable served by the fusing section is, of course, electrically disconnected from the crab joint but the electrical service to any other cable section connected in the crab joint remains intact and is not interrupted or electrically interfered with in the slightest particular.

As previously stated, the form of the invention illustrated is more or less standard, though obviously additional sections or elements of the type described may be employed and connected in unit-formation. Of course, a crab joint of the particular form described, or as a matter of fact, any other form desired, may utilize any selected number of cable terminal connectors equal to or less than the whole number included in the joint, the primary purpose being to provide limiter protection for each individual cable section connected in the joint and to afford uninterrupted electrical continuity between all connected sections in the joint other than the particular section which may be electrically disconnected from the joint by the blowing of the fuse section.

What is claimed as new is:

1. A unit crab joint including a plurality of elements, each end of each element being designed for a cable connection to the unit, an electrical junction formation common to all the elements and between the cable-connecting ends of each element, and fusing protectors for certain of the elements between the common electrical junction and each cable connection end of the element.

2. A construction as defined in claim 1, wherein each element having a fuse connector integrally includes such fuse protector, the cable connecting means at the respective ends, and a part of the electrical junction formation.

3. A construction as defined in claim 1, wherein each fusing protector has end portions of relatively narrow width and a relatively wider intermediate portion.

4. A unitary crab joint including a plurality of elements connected intermediate their ends to provide an electrical junction common to all elements, each element extending in two directions beyond the electrical junction, cable-connecting means at the end of each extension remote from the electrical junction, and fusing protectors integrally provided in each extension of certain of the elements.

5. A construction as defined in claim 1 wherein at least one of the elements is free of any fusing protection.

6. A crab joint, including a unit structure, comprising a plurality of cable terminal connectors, an intermediate junction electrically common to all connectors, and a fusing section between each cable terminal connector and the junction.

7. A construction as defined in claim 6, wherein a pair of cable terminal connectors, a pair of fusing sections, and a part of the electrical junction together constitute an independent integral formation.

8. A crab joint, comprising a unit structure, including a plurality of cable terminal connectors, means whereby all of said cable terminal connectors are in electrical connection one with the other, and means intermediate said common connecting means and each cable terminal connector for interrupting current continuity between the common electrical connecting means and any particular cable terminal connector under predetermined conditions in the cable leading to said connector, the interruption of electrical continuity through the crab joint of any one or more of the cable terminal connectors avoiding interference with electrical connection between all remaining cable terminal connectors.

9. A crab joint made up of a plurality of independent elements, each including cable terminal connectors, an intermediate junction plate, and a fuse section between the junction plate and each cable terminal connector, the plates of the various elements being connected together to provide a junction common to all elements and establishing electrical continuity between all cable terminal connectors.

10. A construction as defined in claim 9, wherein each fuse section is constructed adjacent its respective ends with portions of reduced mass and at its intermediate part with a portion of relatively increased mass.

11. A construction as claimed in claim 9, wherein each element is integrally constructed from a single tubular formation, that part of the element forming the junction plate and fusing sections of the element being a compressed part of the tube.

12. A construction as defined in claim 9, wherein at least one element of the crab joint is of substantially straight form and wherein the remaining elements are centrally offset in U-form, with the junction plates constituting the approximate center of the cross bar of the U.

13. A construction as defined in claim 9 wherein at least one element of the crab joint is of substantially straight form and wherein the remaining elements are centrally offset in U-form, with the junction plates constituting the approximate center of the cross bar of the U and the respective fusing sections arranged beyond the respective ends of the junction plate.

14. In a cable system, a plurality of crab joints for cable connections in the system, each joint including a unitary structure of a plurality of electrically-conductive elements having cable-connecting terminals, a junction common to and electrically connecting all elements, and a connector leading from an element of one crab joint to an element of another crab joint, whereby the connected crab joints are in electrical unity for connecting a number of cables in the system otherwise beyond the capacity of either such crab joint.

15. A construction as defined in claim 14, wherein a fusing protector is provided for certain of the elements between each terminal and electrical junction thereof, the elements of the respective crab joints receiving the connector for electrically connecting such crab joints being free of any fusing protector.

16. A construction as defined in claim 1, including a protective shell covering the crab joint, and a moisture-proof envelope covering the shell.

CONSTANTINE P. XENIS.